Sept. 9, 1941.  C. A. BAKER  2,255,578

ELECTRIC FURNACE

Filed Sept. 9, 1937

INVENTOR.
CLYDE A. BAKER
BY Dorsey, Cole & Garner
ATTORNEYS.

Patented Sept. 9, 1941

2,255,578

UNITED STATES PATENT OFFICE 2,255,578

ELECTRIC FURNACE

Clyde A. Baker, Corning, N. Y., assignor, by mesne assignments, to Owens-Corning Fiberglas Corporation, a corporation of Delaware Application September 9, 1937, Serial No. 163,139

8 Claims. (Cl. 13—6)

This invention relates to electrical resistance furnaces adapted to process high melting point glasses.

Prior to this time it has been proposed to employ electric heating in the fabrication of fine glass filaments commonly known as glass wool. The patent to Gossler, No. 1,954,732 of April 10, 1934 is typical of such teaching. This patent shows glass being melted in an electrically heated metallic trough and issuing from holes in the base thereof in the form of fine filaments. This trough is disclosed as being made of low resistance, non-corrosive alloy steel and the desired temperature is obtained by suitably regulating the voltage impressed on the trough. In Figs. 12 and 13, this trough is substantially enclosed in a body of insulating material to eliminate heat losses due to radiation.

While the structure disclosed by Gossler is suitable for the fabrication of glass wool from many of the softer, low melting point glasses, such devices as the patent discloses have been found unsatisfactory for the melting and fabricating of hard, high melting point glasses, such as certain of the borosilicate group. In an attempt to fabricate such glasses, melting troughs have been constructed of platinum in accordance with the teachings of the British patent to Triggs, No. 428,720 and use has been made of the high temperature platinum-rhodium alloy disclosed in the patent to Weller, No. 2,031,083. In neither instance have satisfactory results been attainable.

In order for any glass to work properly in a glass wool furnace, a highly fluid condition must be attained. This can be had only by raising the temperature of the glass to a point well above the softening temperature of the glass. Glasses of the borosilicate group have softening temperatures ranging from 750° C. to 930° C. and require a working temperature of from 1000° C. to 1300° C. While such temperatures are well below the melting temperature of platinum, which is 1755° C., and of 90% platinum, 10% rhodium alloy which is 1800° C., it has heretofore been impossible to attain such temperatures at the working openings of the furnace. As shown in Fig. 12 of Gossler, and Fig. 7 of Triggs, these openings are located in a portion of the trough which is of necessity exposed to the atmosphere. In the process disclosed by Triggs, large volumes of air are continuously drawn past the tip of the bushing due to the action of the blower located adjacent thereto. It has been found that if the entire bushing is heated to a temperature sufficiently high to overcome the cooling effect of the atmosphere and maintain the desired working temperature at the working openings, those portions of the bushing which are surrounded with insulating material will approximate and often exceed the melting points of such metals or alloys as are available for their construction.

Not only has it been found impossible to maintain a sufficiently high temperature in the tip section of the bushing for the free and satisfactory issuance of high melting point glasses but it has been found to be extremely difficult to satisfactorily melt these glasses in the first place. The rate at which molten glass can be drawn from a bushing in the form of glass wool is relatively low. When the bushing alone is used to melt the glass, maximum production is in the neighborhood of two pounds per hour. Thus the body of glass in the bushing may be maintained at elevated temperatures for a considerable period of time. Experience has taught that these temperatures are so high that it is difficult to maintain them when the upper surface of the glass is exposed to the atmosphere and devitrification of the glass will almost inevitably take place. Such devitrified material is difficult to remelt and refine and will cause clogging of the working openings and generally interfere with production.

The object of this invention is an electrically heated bushing capable of fabricating glass wool from high melting point glasses.

One form of this invention features the use of different materials in different portions of the bushing to provide additional heating capacity in and adjacent to the exposed tip section.

Another form of the invention features the modification of the cross sectional area of the walls of the bushing to provide additional heating capacity in and adjacent to the exposed tip section.

A further feature involves the use of a cover over the top of the bushing designed to prevent the escape of heat from the interior thereof.

The invention will be more fully explained in conjunction with the accompanying drawing, in which.

Figure 1:
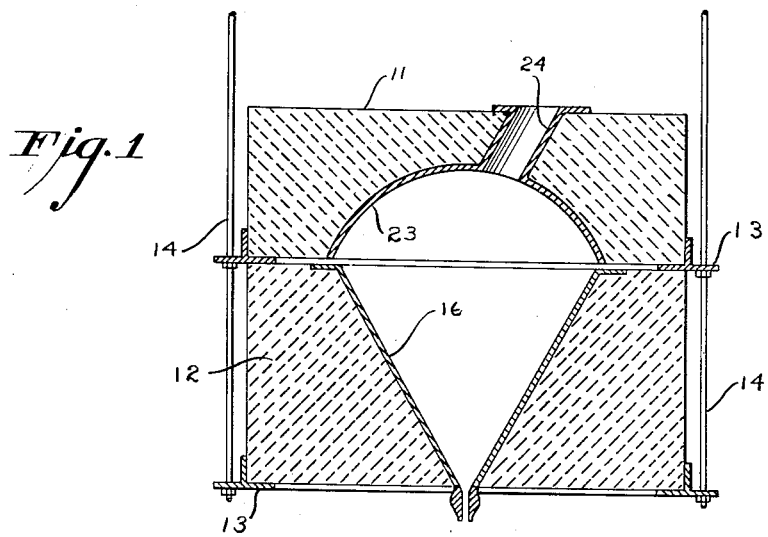
Fig. 1 is an elevation in section thru the center of the furnace.
Figure 2:
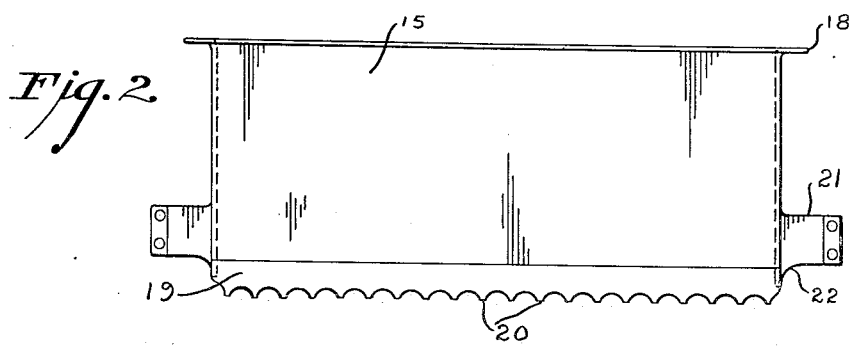
Fig. 2 is a side elevation of the metal liner or bushing in the lower half of the furnace.

The furnace structure shown in Fig. 1 consists of upper and lower sections 11 and 12 formed of high refractory insulating material such as the porous insulating brick sold under the trade name "Armstrong A-1". The choice of refractories is limited merely by the operating temperatures of the furnace and the physical characteristics of the refractories. These refractory bodies are supported in a framework 13 by means of rods 14 suspended from a support, not shown. The lower refractory member 12 is shaped to receive a hollow metal liner or bushing 15 of generally wedge shaped configuration having sloping side walls 16 and vertical end walls 17. A flange 18 extends from the upper edge of this liner and overlies the refractory 12 for a short distance. The side walls 16 converge to form a narrow tip section 19 from which protrude a plurality of nozzles 20 thru which the molten glass may issue. Lugs 21 are formed as integral parts of the end walls 17 adjacent the tip section and serve as terminals for the attachment of electrical conductors by which the desired voltage may be impressed on the bushing.

Figure 3:
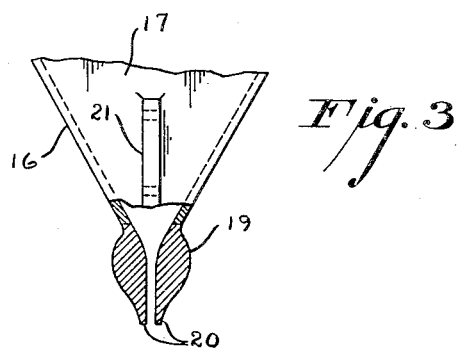
Fig. 3 is an enlarged detail partially in section of the tip portion of the bushing shown in Fig. 2.

Since the tip section of the bushing must of necessity extend out from the surrounding insulation into the atmosphere where it will be subjected to greater cooling than the remainder of the bushing, the bushing is so constructed that more heat will be generated in the tip section than in the adjacent walls. In this manner radiation and conduction losses to the atmosphere are compensated for while the molten glass is maintained at or near the temperature to which it was heated higher up in the insulated part of the furnace. This end may be accomplished either by making the tip section from a metal having a higher conductivity than the body of the bushing or by providing the tip section with much thicker walls than the remainder of the bushing. Either of these arrangements may be utilized independently or they may be combined as shown in Fig. 3 to produce an even more pronounced effect. In any case, the result is to produce a much heavier flow of current thru the tip section than thru the adjacent walls of the bushing thereby generating more heat per unit of surface area. This will not only compensate for atmospheric cooling of the exposed tips and insure constant temperature of the molten glass but the glass temperature may even be raised as it passes thru the tip section.

In the preferred embodiment of this invention, the walls and flanges of the bushing are formed from sheets of 90% platinum-10% rhodium alloy of .04 inch thickness. This material has a resistance of approximately 110 ohms per mil foot at 20° C. The tip section 19 is formed from pure platinum and has a thickness ranging from one and one-half to four times that of the walls to which it is welded. Pure platinum has a resistance of approximately 60 ohms per mil foot at 20° C. Heavy fillets of platinum 22 between the lugs 21 and ends of the tip section 19 assure a low resistance connection between the tip section and the source of electrical energy. Thus an electric conducting structure is provided in which the path of least resistance passes thru the section exposed to the greatest cooling effect. Since electric current flowing thru a body is known to distribute itself in inverse ratio to the resistance of the various portions of the body, concentration of current and the resulting heat is assured in the tip section of the bushing. While pure platinum and platinum-rhodium alloy are preferred for a glass melting furnace, it is obvious that many other metals and alloys might be used depending on the operating conditions encountered.

Altho concentration of current in the tip section of the bushing effectually compensates for heat losses at that point, it is highly advantageous to provide means to reduce, if not entirely eliminate, heat losses from the upper surface of the material in the bushing. While it is common practice to roof over and insulate all kinds of melting furnaces, it is especially advantageous to provide this resistance furnace with a cover of special construction. As shown in Fig. 1, the upper refractory body 11 forms a cover for the melting chamber within the refractory member 12. This body is hollowed out so as to present a semicylindrical opening in register with the top of the bushing. In order to increase the efficiency of the unit the opening is lined with a thin foil 23 of platinum alloy or similar metal which will retain a high polish at elevated temperatures. A duct 24 passing thru the refractory body forms a passage for the introduction of the material to be melted and is likewise lined with metal.

Such an insulating cover serves to conserve heat within the bushing and by lining the cavities of the body 11 with metal which remains bright at operating temperatures the radiant energy which would normally escape is reflected back into the molten material and aids in maintaining it at the desired temperature. Lining the feed opening insures against contamination of the glass by chips of refractory during feeding. It is important that the cover body be so supported that contact between the liner 23 and the bushing 15 is prevented, for unless the liner is specially designed for such operation, any such contact would disturb the current distribution and operating characteristics of the bushing 15. While any suitable liner will contribute to the efficiency of the unit, a semi-cylindrical liner has been found to most satisfactorily concentrate the reflected radiant energy in the top layer of glass where it is most needed.

While I have disclosed a preferred form of my invention modification may be permitted within the scope of the appended claims.

What is claimed is:

1. In an electric furnace for processing high melting point materials, a hollow melting receptacle having its walls formed of an electrically conducting metal, refractory insulating material surrounding said walls, portions of said walls protruding from said refractory to form a working section of said furnace having working openings therein, means for impressing an electrical potential on said walls and working section in parallel, said working section having a higher electrical conductivity than the adjacent wall sections.

2. In an electric furnace for processing high melting point materials, a metallic receptacle constituting a resistance element, said receptacle comprising side walls, a tip section and end walls having terminal lugs formed integrally therewith, said tip section forming with said walls an electrically conducting path between said lugs and having higher electrical conductivity in proportion to its surface area than the adjacent walls.

3. In an electric furnace for processing high melting point materials, a metallic receptacle constituting a resistance element, said receptacle comprising side walls and a tip section arranged as parallel conductors between two integral terminal lugs, said tip section being made of a material having higher electrical conductivity than the material in said walls.

4. In an electric furnace for processing high melting point materials, a metallic receptacle constituting a resistance element, said receptacle comprising side walls and a tip section arranged as parallel conductors between two integral terminal lugs, the material of said tip section being from one and one-half to four times the thickness of the material in said walls.

5. As a new article of manufacture, a resistance element for an electric melting furnace comprising metallic walls, a metallic tip section joining said walls and containing a plurality of working openings, metallic lugs integrally united to the ends of said tip section and the adjacent walls of said receptacle, said tip section constituting the path of least electrical resistance between said lugs.

6. In an electric furnace for processing high melting point materials, a hollow melting receptacle having its walls formed of an electrically conducting metal, refractory insulating material surrounding said walls, portions of said walls protruding from said refractory to form a working section of said furnace having discharge openings therein, and means for impressing an electrical potential on said walls and working section in such manner that they comprise parallel electrical circuits, said working section being formed of a metal having a lower electrical resistance than the material of said adjacent walls.

7. In an electric furnace for processing high melting point materials, a hollow melting receptacle having its walls formed of an electrically conducting metal, refractory insulating material surrounding said walls, portions of said walls protruding from said refractory to form a working section of said furnace having discharge openings therein, and means for impressing an electrical potential on said walls and working section at opposite ends of said working section, said section having a greater volume of material per unit of surface area than said adjacent walls.

8. In an electric furnace for processing high melting point materials, a hollow melting receptacle, refractory insulating material positioned about said receptacle but leaving a section thereof exposed, means for heating said receptacle and means for heating said exposed section to a greater extent than the remainder of said receptacle.

CLYDE A. BAKER.